(12) United States Patent
Sivakumar et al.

(10) Patent No.: US 12,273,229 B2
(45) Date of Patent: Apr. 8, 2025

(54) GLOBAL ALERT MANAGEMENT

(71) Applicant: Alkira, Inc., San Jose, CA (US)

(72) Inventors: Sudarvannan Sivakumar, Milpitas, CA (US); Sanchit Lodha, San Jose, CA (US); Santosh Kumar Dornal, San Ramon, CA (US); Veera Raghavendra Prasad Ravinutala, San Ramon, CA (US); Bharath Chakravarthy, San Ramon, CA (US)

(73) Assignee: ALKIRA, INC., San Jose, CA (US)

( * ) Notice: Subject to any disclaimer, the term of this patent is extended or adjusted under 35 U.S.C. 154(b) by 0 days.

(21) Appl. No.: 18/303,539

(22) Filed: Apr. 19, 2023

(65) Prior Publication Data

US 2023/0344698 A1 Oct. 26, 2023

Related U.S. Application Data

(60) Provisional application No. 63/332,953, filed on Apr. 20, 2022.

(51) Int. Cl.
| | |
|---|---|
| *G06F 15/173* | (2006.01) |
| *H04L 12/46* | (2006.01) |
| *H04L 41/0604* | (2022.01) |
| *H04L 41/0654* | (2022.01) |

(52) U.S. Cl.
CPC ...... *H04L 41/0609* (2013.01); *H04L 12/4633* (2013.01); *H04L 41/0654* (2013.01)

(58) Field of Classification Search
CPC ............ H04L 41/0609; H04L 12/4633; H04L 41/0654
USPC ........................................ 709/204, 223, 224
See application file for complete search history.

(56) References Cited

U.S. PATENT DOCUMENTS

| | | | | |
|---|---|---|---|---|
| 8,626,827 | B1* | 1/2014 | Cabrera | H04L 67/34 370/242 |
| 2014/0047273 | A1* | 2/2014 | Carey | H04L 41/069 714/E11.029 |
| 2015/0033243 | A1* | 1/2015 | Carey | G06F 9/542 719/318 |
| 2017/0244593 | A1* | 8/2017 | Rangasamy | H04L 67/1097 |
| 2019/0027018 | A1* | 1/2019 | Corpus | G08B 29/185 |
| 2021/0026679 | A1* | 1/2021 | Sulcer | G06F 9/5077 |
| 2023/0141909 | A1* | 5/2023 | Truscott | H04L 63/02 726/23 |

* cited by examiner

*Primary Examiner* — Liang Che A Wang
(74) *Attorney, Agent, or Firm* — Vani Moodley, Esq.

(57) ABSTRACT

Disclosed is a system that includes a plurality of regional cloud exchange platforms coupled to a distributed alert triaging engine. A system can include a first regional cloud exchange platform and a second regional cloud exchange platform, each of which includes a regional cloud services monitoring engine and a regional cloud exchange monitoring engine, and an alert triaging engine that provides a triaged alert, or portion thereof, to an appropriate audience.

19 Claims, 9 Drawing Sheets

GLOBAL ALERT MANAGEMENT

CROSS-REFERENCE TO RELATED APPLICATIONS

The present application claims priority to U.S. Provisional Patent Application Ser. No. 63/332,953 filed Apr. 20, 2022, which is incorporated herein by reference.

BACKGROUND

The benefits of cloud computing are real and palpable, and more organizations (big and small) have started embracing cloud adoption as the primary vehicle for their digital transformation journey. And in most cases, the enterprises leverage multiple clouds to take advantage of each cloud's varied capabilities, for business agility and resilience and for vendor lock-in avoidance. And of course existing investments in home grown legacy systems tend to be substantial as well; customers then need to seamlessly and securely connect their legacy systems with their multi-cloud environments. Stitching a network spread across different providers and regions is very complex and cumbersome and it could take months for planning and architecting the network infrastructure.

SUMMARY

A customer with access to a stitched multicloud network is provided with actionable alerts. Instead of inundating the customer with all generated alerts, the various alerts are triaged and a customer alert is generated. In the event operations need take action in response to an alert, instead or in addition, an operations alert is generated.

DETAILED DESCRIPTION

Figure 1:
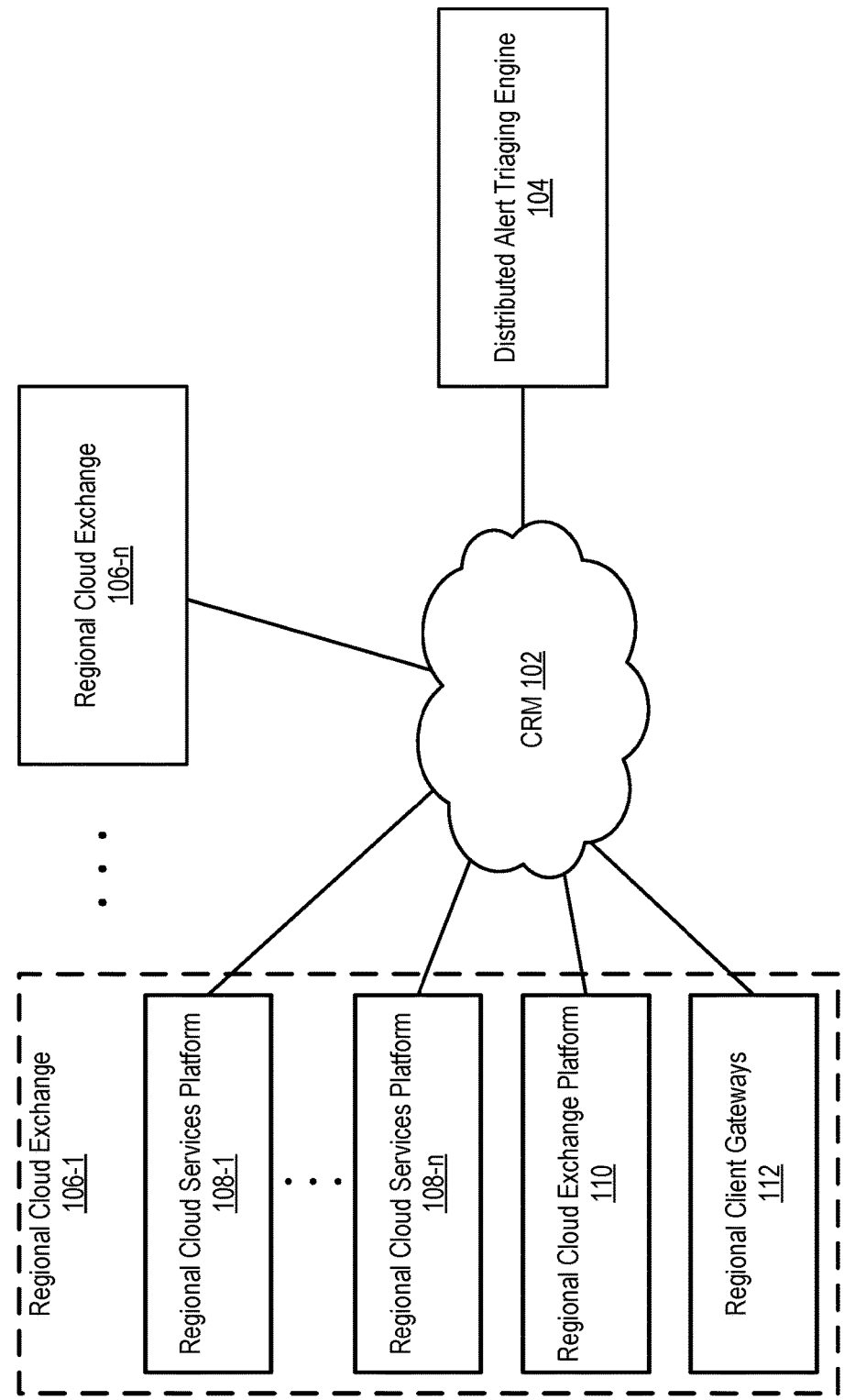
FIG. 1 is a diagram of an example of a multi-tenant VPN service system with regionally distributed alert triaging.

FIG. 1 is a diagram 100 of an example of a multi-tenant Virtual Private Network (VPN) service system with regionally distributed alert triaging. The diagram 100 includes a computer-readable medium (CRM) 102, a distributed alert triaging engine 104, and a regional cloud exchange 106-1 to a regional cloud exchange 106-n (individually, the regional cloud exchange 106; collectively, the regional cloud exchanges 106). The regional cloud exchange 106 includes a regional cloud services platform 108-1 to a regional cloud services platform 108-n (collectively, the regional cloud services platforms 108), a regional cloud exchange platform 110, and regional client gateways 112.

The diagram 100 illustrates multiple clouds stitched securely in a seamless way. Areas of clouds (e.g., Oracle Cloud Connectors) can be probed. These clouds have their own alerting mechanisms. The cloud exchange takes all alerts, and uses artificial intelligence (AI)/machine learning (ML) to read out unwanted data and send most pertinent informational alerts to end users. Multicloud customers don't know about the triage, which is good because when failure occurs, it is hard to pass actionable intelligence. Thus events can be resolved without a customer knowing and alerts can be fashioned to inform the customer who has an action item when an alert is sent. For example, a customer has application on AWS and on Azure stitched on a cloud exchange platform. When connectivity is lost, metrics are gathered and information from Amazon and Azure are curated. For example, Amazon fires alerts, which are analyzed but customers do not receive alerts that both Amazon and the cloud exchange are having problems; alerts are triaged to provide a better description (e.g., AWS is the problem, the cloud exchange is the problem, or both are the problem). Then the customer receives alerts in an organized fashion. (though the moment a partial outage is detected, a customer will typically be alerted, including an indication as to who has the action item).

Applications typically run on a virtual machine (VM), but it is hard to know if a VM is a problem, network connectivity is the issue, or there is some other problem. If a cloud exchange doesn't report any alerts for any regions, it is likely network connectivity is intact. This allows customers to identify a team responsible for an action item and get the right teams involved right away. Typically, customers provide a mailing list, so alerts can be sent to the right team members. Customers often have their own ticketing system; all alerts are (instead or in addition) typically pushed to their ticketing system. Examples of teams are Network Ops, Cloud Ops, Security, and Multicloud Facilitation.

The CRM 102 in intended to represent a computer system or network of computer systems. A "computer system," as used herein, may include or be implemented as a specific purpose computer system for carrying out the functionalities described in this paper. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

Memory of a computer system includes, by way of example but not limitation, random access memory (RAM), such as dynamic RAM (DRAM) and static RAM (SRAM). The memory can be local, remote, or distributed. Non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. During execution of software, some of this data is often written, by a direct memory access process, into memory by way of a bus coupled to non-volatile storage. Non-volatile storage can be local, remote, or distributed, but is optional because systems can be created with all applicable data available in memory.

Software in a computer system is typically stored in non-volatile storage. Indeed, for large programs, it may not even be possible to store the entire program in memory. For software to run, if necessary, it is moved to a computer-readable location appropriate for processing, and for illustrative purposes in this paper, that location is referred to as memory. Even when software is moved to memory for execution, a processor will typically make use of hardware registers to store values associated with the software, and a local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus of a computer system can couple a processor to an interface. Interfaces facilitate the coupling of devices and computer systems. Interfaces can be for input and/or output (I/O) devices, modems, or networks. I/O devices can include, by way of example but not limitation, a keyboard, a mouse or other pointing device, disk drives, printers, a scanner, and other I/O devices, including a display device. Display devices can include, by way of example but not limitation, a cathode ray tube (CRT), liquid crystal display (LCD), or some other applicable known or convenient display device. Modems can include, by way of example but not limitation, an analog modem, an IDSN modem, a cable modem, and other modems. Network interfaces can include, by way of example but not limitation, a token ring interface, a satellite transmission interface (e.g. "direct PC"), or other network interface for coupling a first computer system to a second computer system. An interface can be considered part of a device or computer system.

Computer systems can be compatible with or implemented as part of or through a cloud-based computing system. As used in this paper, a cloud-based computing system is a system that provides virtualized computing resources, software and/or information to client devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their client device.

A computer system can be implemented as an engine, as part of an engine, or through multiple engines. As used in this paper, an engine includes at least two components: 1) a dedicated or shared processor or a portion thereof; 2) hardware, firmware, and/or software modules executed by the processor. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors, or a first engine and a second engine can share one or more processors with one another or other engines. Depending upon implementation-specific or other considerations, an engine can be centralized, or its functionality distributed. An engine can include hardware, firmware, or software embodied in a computer-readable medium for execution by the processor. The processor transforms data into new data using implemented data structures and methods, such as is described with reference to the figures in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a general- or specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud based datastore is a datastore that is compatible with cloud-based computing systems and engines.

Assuming a CRM includes a network, the network can be an applicable communications network, such as the Internet or an infrastructure network. The term "Internet" as used in this paper refers to a network of networks that use certain protocols, such as the TCP/IP protocol, and possibly other protocols, such as the hypertext transfer protocol (HTTP) for hypertext markup language (HTML) documents that make up the World Wide Web ("the web"). More generally, a network can include, for example, a wide area network (WAN), metropolitan area network (MAN), campus area network (CAN), or local area network (LAN), but the network could at least theoretically be of an applicable size or characterized in some other fashion (e.g., personal area network (PAN) or home area network (HAN), to name a couple of alternatives). Networks can include enterprise private networks and virtual private networks (collectively, private networks). As the name suggests, private networks are under the control of a single entity. Private networks can include a head office and optional regional offices (collectively, offices). Many offices enable remote users to connect to the private network offices via some other network, such as the Internet.

The distributed alert triaging engine 104 ensures clouds and branch networks are proactively monitored and alerts are raised with appropriate severity so that corrective actions can be taken upfront prior to any major disruptions to services. The types of alerts can be categorized as Data Plane Alerts, Control Plane Alerts, Provisioning Alerts, and Cloud Alerts.

Endpoints (across all regions) are proactively monitored for network connectivity. Probe packets are sent to all endpoints to which customer is connected, which enables detection of latency issues, connectivity issues, etc. and pinpoints which endpoint has an issue. In a specific implementation, agents run on all nodes and are polled using a centralized mechanism, but probe sources are distributed so as to be near relevant nodes. There are typically different polling mechanisms for each cloud. If a failure is detected, a data plane alert is generated right away warning of a potential impact to workloads in that specific region of that specific provider.

A robust control plane is required for network(s) to be in a stable state; if the control plane goes down or is unstable for certain endpoints, traffic flows to those endpoints are going to be severely impacted. When problematic endpoints are identified, control plane alerts are generated so remedial actions can be taken immediately.

Network provisioning is when customer end points (clouds, branches, data centers and remote users) in different regions connect to the cloud exchange platform 110 to form a unified network backbone. If there are issues with IAM roles and permissions, limits, deprecated constructs etc.—provisioning alerts are raised so errors can be expeditiously rectified. 90% of issues are user configuration errors. Alerts regarding configuration can be provided to indicate what was done may not match intentions.

All public clouds have their own cloud monitoring and alerting capabilities for various events. These alerts are probed proactively to inform customers of catastrophic events and vulnerabilities via cloud alerts; customers no longer need to jump through various hoops and portals to analyze and debug issues.

The distributed alert triaging engine 104 is described in greater detail below. The distributed alert triaging engine 104 can be considered to be distributed across the regional cloud exchanges 106, but, in a specific implementation, the distributed alert triaging engine 104 also includes a global alert management system that may or may not be distributed across the regional cloud exchanges 106.

The regional cloud exchange 106 is intended to represent a collection of cloud services and branch nodes within a region, coupled to a regional cloud exchange platform.

The regional cloud services platforms 108 are intended to represent cloud services, such as Amazon Web Services (AWS), Azure, Google Cloud Platform (GCP), etc. In a specific implementation, the regional cloud services platforms 108 have associated Service point attachment nodes (S-nodes) 108, which are multi-tenant node engines adapted to orchestrate the instantiation, hosting, and/or provisioning of services (selected via a portal accessible in association with the regional client gateways 112) to one or more endpoints on behalf of a customer. S-nodes may host services and apply policies that might otherwise only be available through other cloud platforms, in other regions or otherwise only available with certain connectivity. For instance, if a customer using regional cloud services platform 108-1 desired certain security features provided by Firewall X service that was only available through regional cloud services platform 108-$n$, the S-nodes may, via an orchestration component, host the Firewall X service for the customer so that the customer may obtain the service as though they were using regional cloud services platform 108-$n$. Even if a customer uses different cloud platforms or has different connectivity throughout different segments of its network, the dashboard associated with an applicable one of the regional client gateways 112 may provide features (e.g., monitoring traffic, managing connectivity, etc.) within the same dashboard interface. In a specific implementation, to effectuate these features, all data traffic is routed through the S-nodes.

The S-nodes may send/receive traffic to and from networks implementing any type of connectivity (e.g., MPLS, SD-WAN, $IP_{SEC}$, etc.) and host services from any one or more providers so that the connecting networks may receive the benefit of those services without the hassle of reconfiguring their network to adapt to the service provider's requirements. The S-nodes can instantiate such services automatically upon request, so that an individual user associated with or connected through a branch network does not have to instantiate the services themselves. The S-nodes may collect telemetry data (e.g., to share with a multi-tenant orchestrator component), may tie the data flow to an application once packet details have been determined, may conduct analytics (e.g., statistical analysis) on data flow on a tailored basis (e.g., one in every ten packets received may be subjected to a deep packet inspection routine), and may tag or add instructions to packets for execution at a workload.

The regional cloud exchange platform 110 is intended to represent a system that establishes connectivity, instantiates services for corresponding geolocations, aggregates data, implements policies, monitors traffic, and/or provide analytics across disparate cloud service providers and different connectivity architectures. In a specific implementation, the regional cloud exchange platform 110 operates in a manner that—to the customer—is connectivity agnostic and cloud provider agnostic. The regional cloud exchange platform 110 may correspond to aggregated services offered for a given region or set of regions, where the regions may comprise one or more zones corresponding to subsections of such regions. In the example of FIG. 1, the regional cloud exchange platform 110 is intended to represent a regional instance for the regional cloud exchange 106-1, but other regional cloud exchanges (e.g., the regional cloud exchange 106-$n$) have associated regional cloud exchange platforms (not shown). The regional cloud exchange platform 110 may service branch networks within a region, and multiple regional cloud exchange platforms 110 may be stitched together as part of a larger cloud servicing network (e.g., mesh network, hub-and-spoke network, or a network having some other topology) to span multiple regions. In a specific implementation, the regional cloud exchange platform 110 provides a portal through which a network administrator or other user associated with one of the regional client gateways 112 may (i) view and select SaaS/IaaS/other services from a range of providers (or provided by the customer itself) within a common dashboard, (ii) manage connectivity (e.g., MLPS, SD-WAN, $IP_{SEC}$, etc.), (iii) monitor traffic, (iv) control traffic in accordance with one or more policies (e.g., security policies), etc.

In a specific implementation, the regional cloud exchange platform 110 includes a Virtual Private Cloud (VPC) node (V-node) that couples the regional cloud exchange platform 110 to a VPC. The VPC is intended to represent a SaaS, IaaS, PaaS, or V-net. In a specific implementation, the V-node is responsible for cloud-to-cloud traffic. For example, the V-node (potentially including other V-nodes, not shown) connects the regional cloud exchange platform 110 to each of the regional cloud services platforms 108.

The regional cloud exchange platform offers a cohesive and a single pane of management and visibility tool. From the portal, a customer can globally apply policies, manage routes, deploy third party services from the marketplace and monitor their network for adequate performance or anomalies. The last point is very critical, a degraded network leads to poor application performance which in turn has a direct impact on the enterprise's bottom line.

In a specific implementation, the regional client gateways 112 include a Branch-facing node (B-node, not shown) that couples a branch network to the regional cloud exchange 106. In a specific implementation, the B-node is responsible for branch-to-cloud traffic. For example, the branch network is intended to represent a campus, site, data center, or other branch network under the control of a customer. In a specific implementation, the B-node creates an overlay to connect a network branch to the cloud. Data traffic originating from the branch network within a given region may be controlled, managed, observed, and evaluated by the regional cloud exchange platform. In a specific implementation, the customer, or a human or artificial agent thereof, managing the branch network, or a portion thereof, can access a single portal to select one or more of the services in connection with a software as a service (SaaS), IaaS, or PaaS offering. In a specific implementation, the B-node (potentially including other B-nodes, not shown) connects the regional cloud exchange platform to multiple different branch networks.

Figure 2:
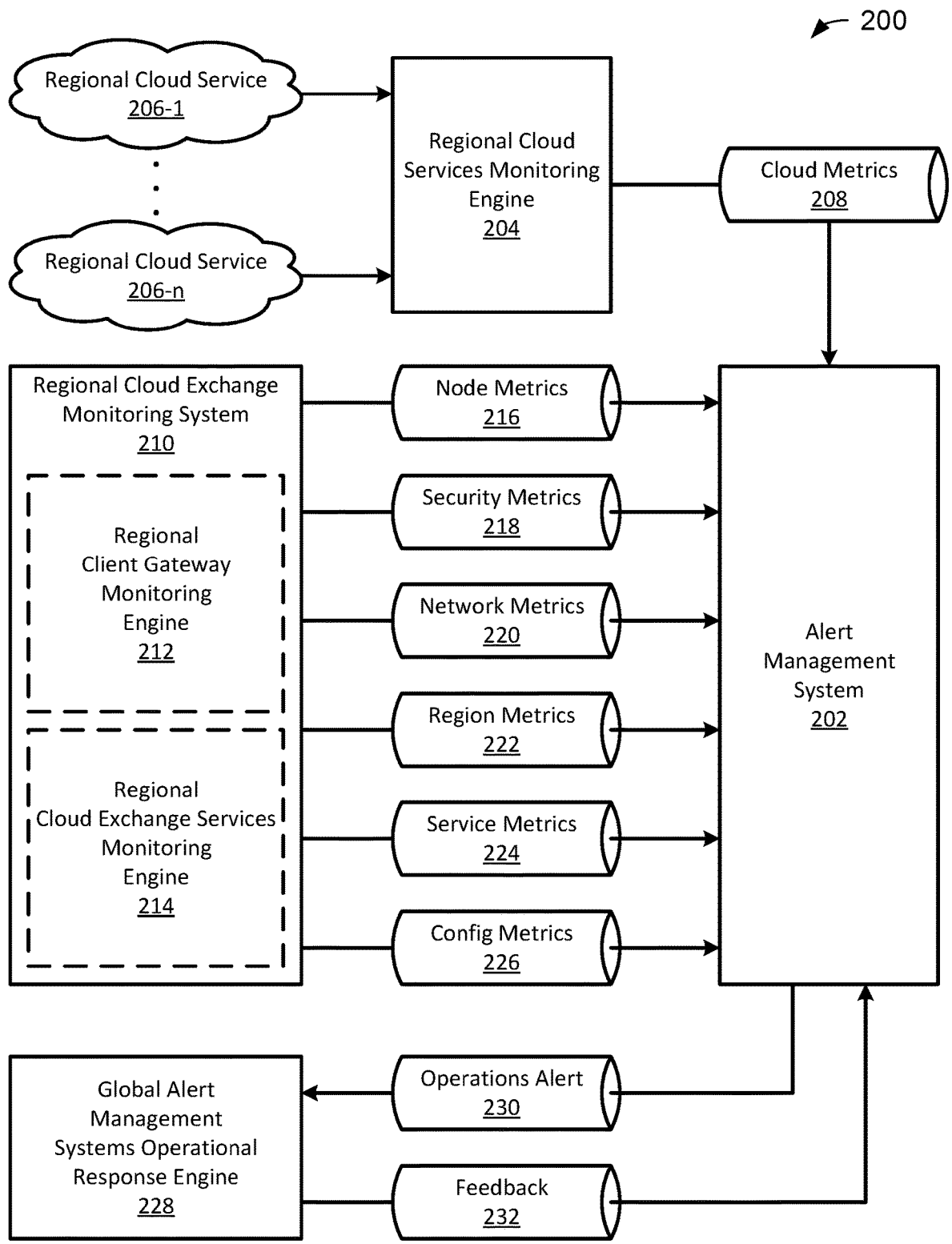
FIG. 2 is a diagram of an example of a regional cloud exchange with a global alert management systems operational response engine.

FIG. 2 is a diagram 200 of an example of a regional cloud exchange with a global alert management systems operational response engine. The diagram 200 includes an alert management system 202; a regional cloud services monitoring engine 204; a regional cloud service 206-1 to a regional cloud service 206-n (collectively, the regional cloud services 206) coupled to the regional cloud services monitoring engine 204; a cloud metrics datastore 208 coupled to the regional cloud services monitoring engine 204 and the alert management system 202; a regional cloud exchange monitoring system 210, which includes a regional client gateway monitoring engine 212 and a regional cloud exchange services monitoring engine 214; a node metrics datastore 216; a security metrics datastore 218; a network metrics datastore 220; a region metrics datastore 222; a service metrics datastore 224; a configuration metrics datastore 226; a global alert management systems operational response engine 228; an operations alert datastore 230 coupled to the alert management system 202 and the global alert management systems operational response engine 228; and a feedback datastore 232 coupled to the alert management system 202 and the global alert management systems operational response engine 228. The datastores 216-226 are coupled to the regional cloud exchange monitoring system 210 and the alert management system 202. The regional cloud services monitoring engine 204 can be considered part of the regional cloud exchange monitoring system 210.

The alert management system 202 is intended to represent a manager (not simply a messenger); the buck is not passed onto the customer blindly, plenty of alerts in a short interval of time could overwhelm the customer and remedial actions cannot be performed instantly. The alert management system gathers alerts from all data sources (from cloud exchange platforms and cloud providers in all regions), using a proprietary AI/ML algorithm processes all alerts, extracts the most actionable alerts and relays them to the customer. For example, if a link down event to a certain region of a cloud provider is detected and at the same time fetches a site operational issue from the cloud provider, the alert management system 202 determines that both alerts point to the same underlying cause. Only the cloud provider's alert is sent to the customer and once that is resolved, intertwined alerts are resolved, as well. This is very powerful; extracting actionable and relevant information from multiple data sources leads to extremely quick turnaround times for system wide failures and discrepancies. This process is described in greater detail below with reference to, for example, FIG. 3.

The regional cloud services monitoring engine 204 is intended to represent an engine that is coupled to the regional cloud services 206 and provides cloud metrics (represented in the example of FIG. 2 as the cloud metrics datastore 208) to the alert management system 202. Cloud metrics are useful for generating cloud alerts, and can be useful in triaging and generating other alerts, as well.

The regional cloud exchange monitoring system 210 is similar to the regional cloud services monitoring engine 204 (the latter of which could be considered part of the former), but is intended to represent an engine that is coupled to other components of a regional cloud exchange. The regional client gateway monitoring engine 212 is intended to represent an engine that monitors traffic and conditions in associated with B-nodes (e.g., at the intersection between the exchange and branch networks). The regional cloud exchange services monitoring engine 214 is intended to represent an engine that monitors traffic and conditions within the cloud exchange. The regional client gateway monitoring engine 212 can be considered optional in the sense that the monitoring can be considered to be done across all aspects of the exchange monitoring system, from gateway to service (and vice versa). The metrics (represented in the example of FIG. 2 as the metrics datastores 216-226) are provided to the alert management system 202. Examples of metrics include service capacity, database lock, traffic and CPU load, traffic and BGP down, server status and disk, traffic and flow, Kubectl (e.g., node restart, load, traffic, disk, space), Kube (e.g., image, stateful set down), bandwidth, sessions, throughput, descriptor usage, and memory usage. Kubectl is a client program of Kubernetes. Kube-proxy is an implementation of a network proxy and a load balancer.

The global alert management systems operation response engine 228 responds to operations alerts (represented in the example of FIG. 2 as the operations alert datastore 230) by taking actions described in more detail below with reference to, e.g., FIG. 4 and provides feedback (represented in the example of FIG. 2 as the feedback datastore 232) to the alert management system 202.

Figure 3:
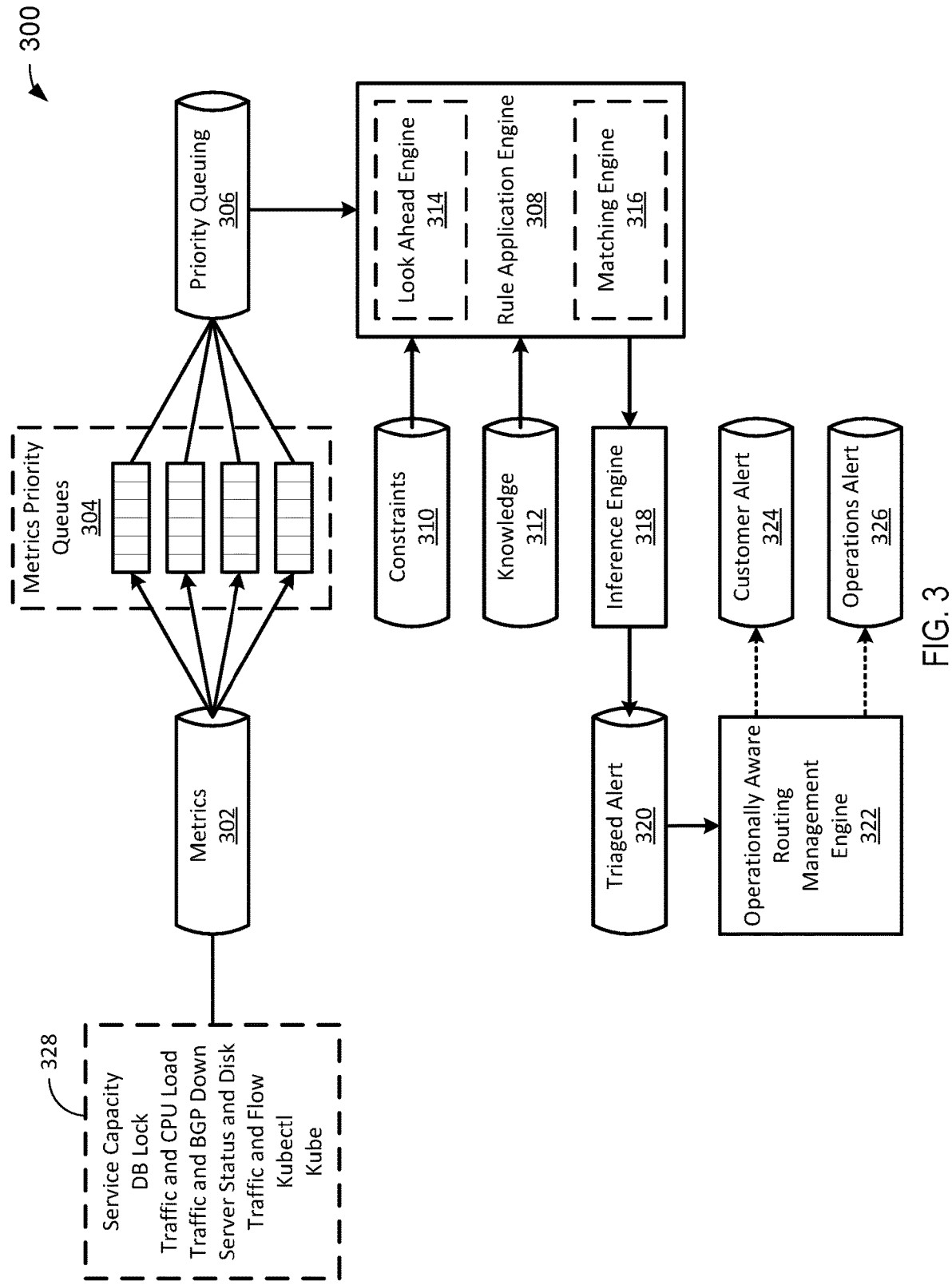
FIG. 3 is a diagram of an example of an alert management system.

FIG. 3 is a diagram 300 of an example of an alert management system. The diagram 300 includes a metrics datastore 302; metrics priority queues 304 coupled to the metrics datastore 302; a priority queuing datastore 306 coupled to the metrics priority queues 304; a rule application engine 308 coupled to the priority queuing datastore 306; a constraints datastore 310; a knowledge datastore 312; an inference engine 318 coupled to the rule application engine 308, the constraints datastore 310, and the knowledge datastore 312; a triaged alert datastore 320 coupled to the inference engine 318; an operationally aware routing management engine 322 coupled to the triaged alert datastore 320; a customer alert datastore 324 coupled to the operationally aware routing management engine 322; and an operations alert datastore 326 coupled to the operationally aware routing management engine 322. The rule application engine 308 includes a look ahead engine 314 and a matching engine 316.

In a specific implementation, the metrics datastore 302 can include cloud metrics, node metrics, security metrics, network metrics, region metrics, service metrics, and configuration metrics (see, e.g., FIG. 2, datastores 208, 216-226). Some example metrics are provided in the dashed box 328.

The metrics are prioritized in the metrics priority queues 304. In the example of FIG. 3, there are four priority queues, which can be referred to as Priority 1 (P1) to Priority 4 (P4). The metrics are provided to the rule application engine 308 from the priority queuing datastore 306.

The rule application engine 308 considers alert constraints by consulting the constraints datastore 310 and can classify metrics using knowledge from the knowledge datastore 312. Constraints can include scope, duration, resource type, conditions, pattern, and hierarchy relationship, to name several parameters. Alerting rules leverage AI/ML across various services and platforms. Some examples of rule application are provided later starting with FIG. 6.

The inference engine 318 uses the knowledge about the various alerts to triage (removing alerts that have no actionable value, removing redundant alerts, etc.) and provides a triaged alert (represented as the triaged alert 320 in the example of FIG. 3) to the operationally aware routing management engine 322.

The operationally aware routing management engine 322 determines an audience for the triaged alert (e.g., customer or operations) and makes either a customer alert (represented as the customer alert 324 in the example of FIG. 3) or an operations alert (represented as the operations alert 326 in the example of FIG. 3) available to the applicable audience. It may be noted that, in some instances, an alert can be generated for both a customer and operations in relation to a single event, though the alert can provide different information. For the operationally aware routing management engine 322 to be characterized as "operationally aware", the engine can be configured to include a mailing list or other means of contacting appropriate team members for response to an alert. Customers often have their own ticketing systems, so alerts can (instead or in addition) be pushed to their ticketing systems.

Figure 4:
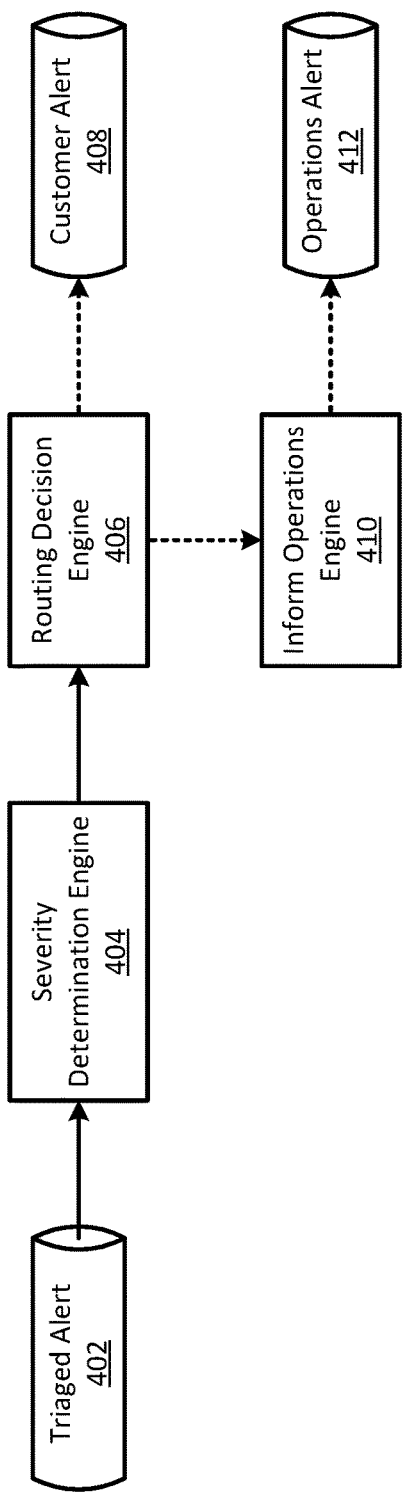
FIG. 4 is a diagram of an example of an operationally aware routing management engine.

FIG. 4 is a diagram 400 of an example of an operationally aware routing management engine. The diagram 400 includes a triaged alert datastore 402, a severity determination engine 404 coupled to the triaged alert datastore 402, a routing decision engine 406 coupled to the severity determination engine 404, a customer alert datastore 408 coupled to the routing decision engine 406, an inform operations engine 410 coupled to the routing decision engine 406, and an operations alert datastore 412 coupled to the inform operations engine 410. The triaged alert datastore 402 can be generated by an inference engine as described above with reference to FIG. 3.

In a specific implementation, the severity determination engine 404 uses information in an alert to determine severity. In an alternative, the severity determination engine 404 can consult a knowledge datastore to determine severity.

The routing decision engine 406 determines whether an alert should be provided to a customer, to operations, to some other party, or to multiple parties. In the example of FIG. 4, the options include only customer or operations (though an alert could be sent to both in association with a single event, if applicable). If the routing decision engine 406 determines the customer is an applicable audience for an alert, the routing decision engine 406 makes a customer alert (represented in the example of FIG. 4 as the customer alert datastore 408) available to the customer. If, on the other hand, the routing decision engine 406 determines operations is an applicable audience for an alert, the routing decision engine 406 passes control to the inform operations engine 410.

In a specific implementation, the inform operations engine 410 determines whether to call, email, or message operations. In any case, the operations alert (represented in the example of FIG. 4 as the operations alert datastore 412) can be considered relevant information for an alert, whether the alert is actually received via a phone call or in an email or message.

Figure 5:
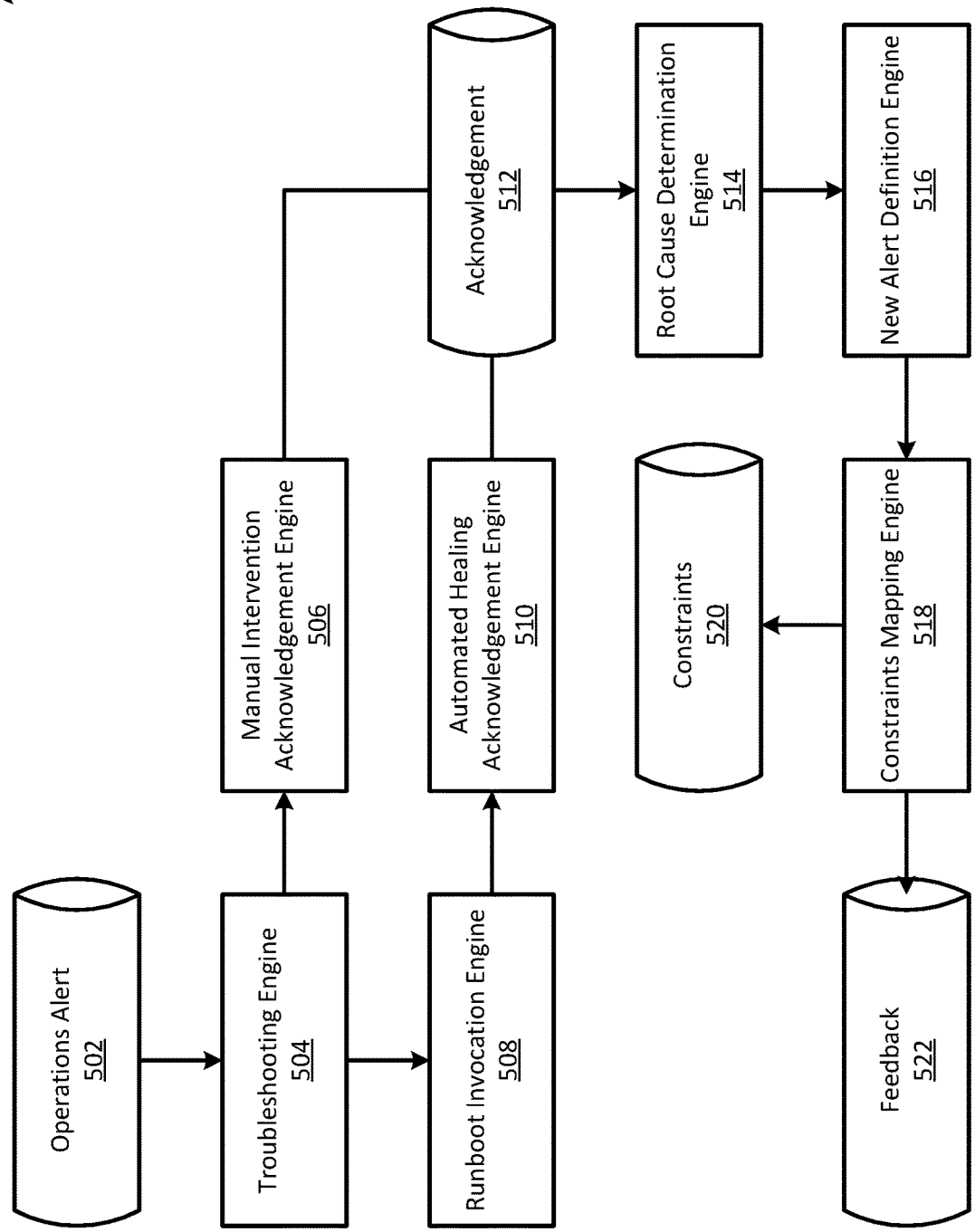
FIG. 5 is a diagram of an example of a global alert management systems operational response engine.

FIG. 5 is a diagram 500 of an example of a global alert management systems operational response engine. The diagram 500 includes an operations alert datastore 502, a troubleshooting engine 504 coupled to the operations alert datastore 502, a manual intervention acknowledgement engine 506 coupled to the troubleshooting engine 504, a runboot invocation engine 508 coupled to the troubleshooting engine 504, an automated healing acknowledgement engine 510 coupled to the runboot invocation engine 508, an acknowledgement datastore 512 coupled to the manual intervention acknowledgement engine 506 and the automated healing acknowledgement engine 510, a root cause determination engine 514 coupled to the acknowledgement datastore 512, a new alert definition engine 516 coupled to the root cause determination engine 514, a constraints mapping engine 518 coupled to the new alert definition engine 516, a constraints datastore 520 coupled to the constraints mapping engine 518, and a feedback datastore 522 coupled to the constraints mapping engine 518. The operations alert 516 can be generated by an alert management system as described above with reference to FIG. 2. The constraints datastore 520 can provide alert constraints to a rules application engine as described above with reference to FIG. 3. The feedback datastore 522 can be provided to an alert management system as described above with reference to FIG. 2.

Upon notification of an operations alert, the troubleshooting engine 504 can direct an operations agent to perform manual intervention in response to the operations alert 516. Upon completion of the manual intervention, the manual intervention acknowledgement engine 506 generates an acknowledgement (represented in the example of FIG. 5 as the acknowledgement datastore 512). Alternatively, the troubleshooting engine 504 can pass control to the runboot invocation engine 508, which invokes runboot in an effort to prompt automated healing. The automated healing acknowledgement engine 510 generates an acknowledgement of this (represented in the example of FIG. 5 as the acknowledgement datastore 512). Other responses are also possible; manual intervention and runboot are provided as two examples.

The root cause determination engine 514 determines the cause of the alert and, if applicable, the new alert definition engine 516 defines a new alert and the constraints mapping engine 518 updates the constraints datastore 520 accordingly. Feedback (represented in the example of FIG. 5 as the feedback datastore 522) is then provided back to an alert management system (e.g., to update a knowledge datastore).

Figure 6:
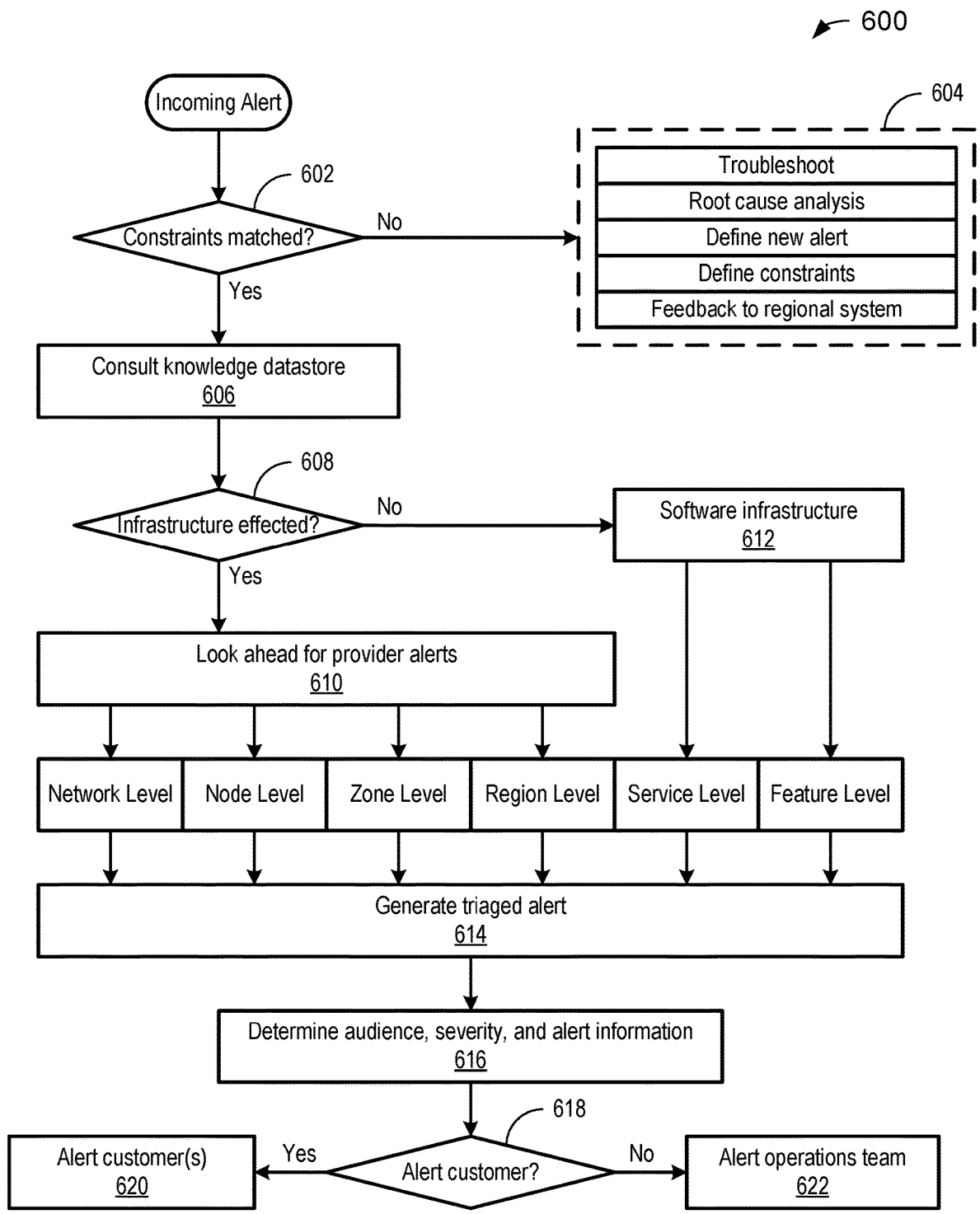
FIG. 6 is a flowchart of an example of a method of alert management.

FIG. 6 is a flowchart 600 of an example of a method of alert management. The flowchart 600 starts at decision point 602 where, in response to an incoming alert, it is determined whether alert constraints are matched. Alert constraints are matched if the incoming alert has values that match those of a constraints datastore for an alert or fall within a range of values for same. If it is determined constraints are not matched (602-No), the flowchart 600 continues to module 604 where troubleshooting, root cause analysis, definition of a new alert, definition of constraints of the new alert, and feedback are performed.

If, on the other hand, it is determined constraints are matched (602-Yes), then the flowchart 600 continues to module 606 where a knowledge datastore is consulted and the flowchart 600 continues to decision point 608 where the information from the knowledge datastore is used to make a decision related to the incoming alert.

At decision point 608, it is determined whether infrastructure is affected. If it is determined infrastructure is affected (608-Yes), then the flowchart 600 continues to module 610 where a look ahead for provider alerts is performed. Using the look ahead process, the alert can be associated with a network level, node level, zone level, or regional level, as illustrated in the boxes between modules 610 and 614. If, on the other hand, it is determined infrastructure is not affected (608-No), then the flowchart 600 continues to module 612 where software infrastructure analysis is performed. Using software infrastructure analysis, the alert can be associated with service level or feature level, as illustrated in the boxes between modules 612 and 614. In either case, the flowchart 600 continues to module 614 with triaging the alert. Triaging the alert includes preventing the forwarding of redundant or non-actionable alerts.

The flowchart 600 continues to module 616 with determining the audience, severity, and information to be provided in an informational (triaged) alert. In accordance with the determined audience, at decision point 618 it is determined whether to alert the customer. If it is determined the customer is to be alerted (618-Yes), customer(s) is/are alerted at module 620. If, on the other hand, it is determined the customer is not to be alerted (620-No), an operations team is alerted at module 622. (The operations team may or may not also be alerted when customer(s) are alerted.)

Consider a tunnel health alert by way of example. A tunnel health alert is associated with control plane and cloud alerts. Metrics from a regional cloud exchange and metrics from one or more cloud providers are considered. An applicable rule trigger could be when a link goes down at the regional cloud exchange and a cloud service provider reports an outage for 5 minutes. If the event is triggered once, the alert is P1 and if the event happens frequently, a learning engine can mark the event as an informational event P4.

Alerts are generated and routed to one or more configured interfaces. In this example, a customer alert can be sent to a customer portal (or via some other channel, such as email, if appropriately configured). An operations alert can be sent in accordance with severity. For example, P1 can include a call to on-call engineer (e.g., via OpsGenie) and an alerts-critical generated for the applicable team (e.g., on Slack); P4 (informational alert) can be sent as a notification (e.g., via OpsGenie) and an alerts-warning generated for the applicable team (e.g., on Slack).

The YAML configurations for a Tunnel Health Alert (e.g., Branch going down), where "alert" is the name of the alert, "expr" is the query of the alert rule that evaluates events based on metrics, "for" is the time span for which the rule needs to be true, and "labels" are labels attached to the alert rule that help in categorizing the alerts, could be:

name: TunnelHealth
rules:
alert: IngressTunnelDown
expr: (tunnel_status{source_node_type="BNODE", tunnel_name!~"vxlan.*"}==0) and on(name, tunnel_name) (sum_over_time (tunnel_status{source_node_type="BNODE", tunnel_name!~"vxlan.*"}[1 h]) !=0)
for: 3 m
labels:
severity: info
annotations:
summary: "Ingress tunnel [{{$labels.tunnel_name}}]-[{{$labels.name}}] Down"
description: "Ingress tunnel from [{{$labels.source_node_type}}] to [{{$labels.dest_node}}] for tenant [{{$labels.tenant}}] is down"
alert: IngressTunnelDownCritical
expr: (changes (tunnel_status{source_node_type="BNODE", tunnel_name!~"vxlan.*"}[2 h])>0) and on(name, tunnel_name) (tunnel_status{source_node_type="BNODE", tunnel_name!~"vxlan.*"}==0)
for: 1 h
labels:
severity: warning
annotations:
summary: "Ingress tunnel [{{$labels.tunnel_name}}]-[{{$labels.name}}] Down for 1 h"
description: "Ingress tunnel from [{{$labels.source_node_type}}] to [{{$labels.dest_node}}] for tenant [{{$labels.tenant}}] is down for 1 h"

Another example of a YAML configuration for a Provisioning Alert (e.g., failures, in-progress, success alerts) is:
name: TenantProvisioningNetworkState
rules:
alert: TenantNetworkFailed
expr:
"(changes (tenant_provisioning_service_network_state{state=~'FAILED'}[5 m])>0) and on(tenant_id, network_name, kubernetes_pod_name) (tenant_provisioning_service_network_state{state=~'FAILED'}==1)"
annotations:
summary: "Provisioning {{$labels.state}} for Tenant: [{{$labels.network_name}}]"
description: "Provisioning {{$labels.state}} for Tenant: [{{$labels.network_name}}], NetworkId: [{{$labels.network_id}}], TenantId: [{{$labels.tenant_id}}]"

```
labels:
    severity: error
    alert: TenantNetworkInProgress
    expr:
        "(changes(tenant_provisioning_service_network_state
            {state='IN_PROGRESS'}[5 m])>0) and on(tenant_id,
            network_name, kubernetes_pod_name) (tenant_provi-
            sioning_service_network_state
            {state='IN_PROGRESS'}==1)"
    annotations:
        summary: "Provisioning IN_PROGRESS for Tenant:
            [{{$labels.network_name }}]"
        description: "Provisioning IN_PROGRESS for Tenant:
            [{{$labels.network_name}}], NetworkId: [{{$label-
            s.network_id}}], TenantId: [{{$labels.tenant_id}}]"
    labels:
        severity: info
    alert: TenantNetworkSuccess
    expr:
        "(changes(tenant_provisioning_service_network_state
            {state='SUCCESS'}[5 m])>0) and on(tenant_id, net-
            work_name, kubernetes_pod_name) (tenant_provi-
            sioning_service_network_state
            {state='SUCCESS'}==1)"
    annotations:
        summary: "Provisioning SUCCESSFUL for Tenant:
            [{{$labels.network_name}}]"
        description: "Provisioning SUCCESSFUL for Tenant:
            [{{$labels.network_name}}], NetworkId: [{{$label-
            s.network_id}}], TenantId: [{{$labels.tenant_id}}]"
    labels:
        severity: info
    alert: TenantProvisioningStuckInProgress
    for: 60 m
    expr:    '(tenant_provisioning_service_network_state
            {state="IN_PROGRESS"}==1)    and    on(tenant_id)
            (tenant_manager_tenant_state{state=
            "ONBOARDED"}==1)'
    annotations:
        summary: "Provisioning stuck IN_PROGRESS for Ten-
            ant: [{{$labels.network_name}}], NetworkId: [{{$la-
            bels.network_id}}], TenantId: [{{$labels.tenant_id}}]"
        description: "Provisioning stuck IN_PROGRESS for Ten-
            ant: [{{$labels.network_name}}], NetworkId: [{{$la-
            bels.network_id}}], TenantId: [{{$labels.tenant_id}}]"
    labels:
        severity: error
```

Other alert rules can include connectivity partial rule (P2), connectivity down rule (P1), repeated events rule, failure to provision (exchange vs. Cloud) rule, out of elastic IP addresses rule, and permission violation rule. Regarding the failure to provision rule, there can be region-specific limitations. E.g., reached application limit on AWS for a region. Different regions have different resources, so what works in one place may not work in another. Triaged alerts can explain why provision fails.

Figure 7:
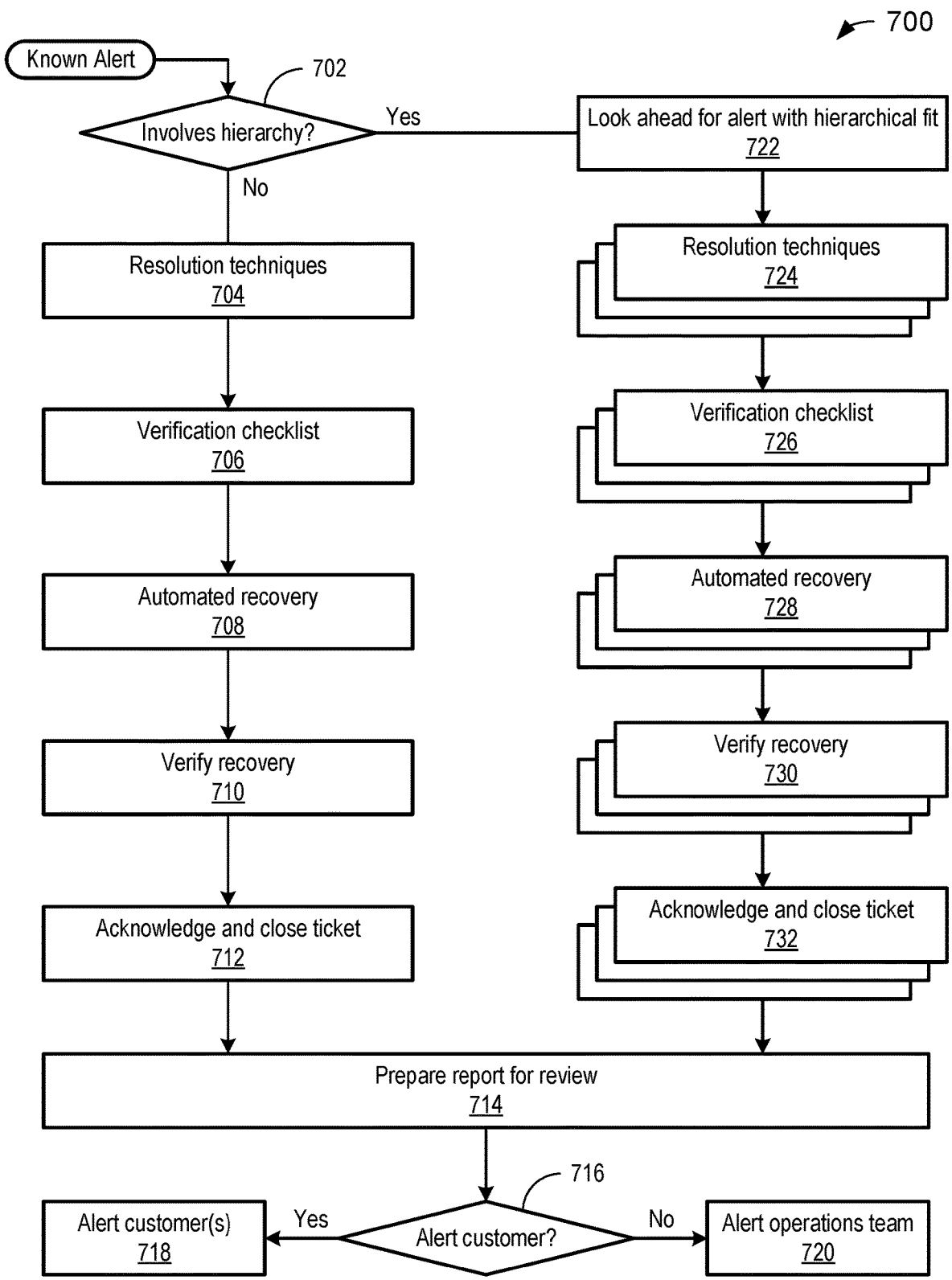
FIG. 7 is a flowchart of an example of hierarchical alert management.

FIG. 7 is a flowchart 700 of an example of hierarchical alert management. In a specific implementation, the flowchart 700 is supported with machine learning. For example, alert constraints and outcomes are fed to a machine for supervised learning and prediction analysis after mapping constraints of a known alert. Advance notice of future alerts can then be provided to an ops team.

The flowchart 700 starts at decision point 702 with determining whether a known alert involves a hierarchy of alerts. If it is determined a known alert does not involve a hierarchy of alerts (702-No), then the flowchart 700 continues to module 704 with orchestrating resolution techniques, to module 706 with following a verification checklist, to module 708 with carrying out automated recovery, to module 710 with verifying recovery, to module 712 with acknowledging and closing ticket, and to module 714 with preparing report for review.

The flowchart 700 continues to decision point 716 where it is determined whether to alert customer. If it is determined customer should be alerted (716-Yes), then the flowchart 700 ends at module 718 with alerting customer(s). An operations team may be alerted in some or all instances in which customers are alerted. If, on the other hand, it is determined customer should not be alerted (716-No), then the flowchart 700 continues to module 720 with alerting operations team.

Referring once again to decision point 702, if it is determined the known alert involves a hierarchy of alerts (702-Yes), then the flowchart 700 continues to module 722 with looking ahead for alert with a hierarchical fit. In a specific implementation, alerts that fit into the alert hierarchy are handled in batches, which are represented as the multiple-box representation of module 724-732. The flowchart 700 continues to module 724 with orchestrating resolution techniques for the alerts in the hierarchy of alerts, to module 726 with following a verification checklist for the alerts, to module 728 with carrying out automated recovery in association with the alerts, to module 730 with verifying recovery in association with the alerts, and to module 732 with acknowledging and closing ticket associated with the alerts. The flowchart 700 then returns to module 714 with preparing report for review and continues as described previously. In a specific implementation, at module 718, a customer receives a single alert associated with a plurality (or subplurality) of alerts in the hierarchy of alerts. In a specific implementation, at module 720, an operations team receives a single alert associated with a plurality (or subplurality) of alerts in the hierarchy of alerts.

Figure 8A:
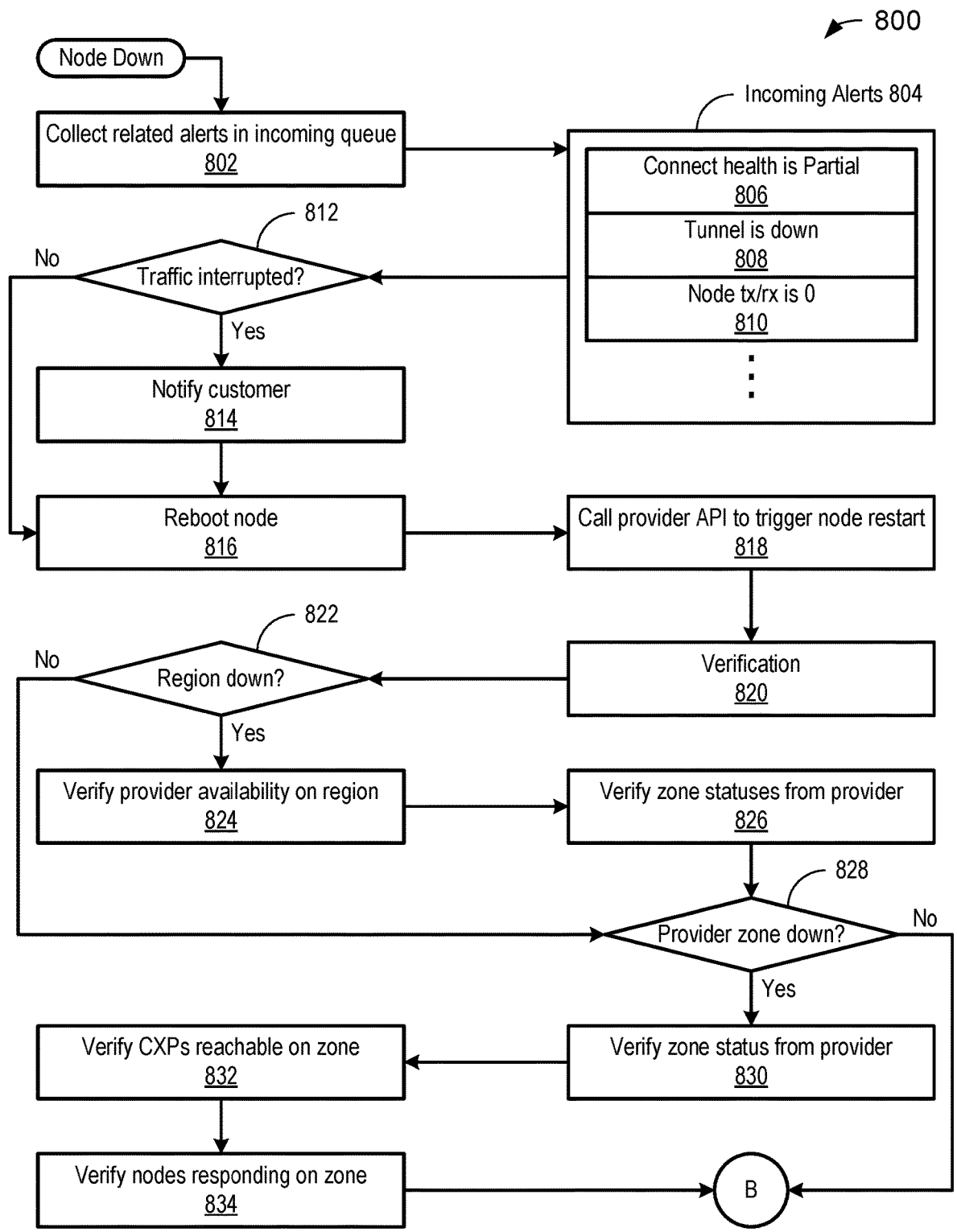
FIGS. 8A and 8B is a flowchart of alert correlation and handling.
Figure 8B:
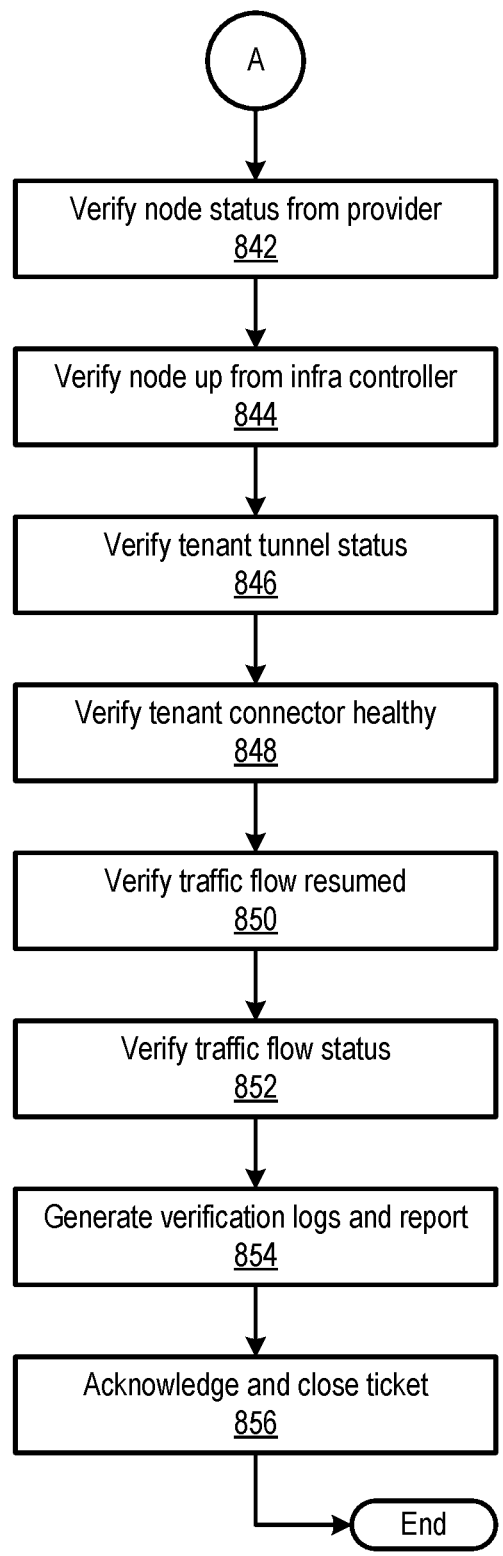

FIGS. 8A and 8B is a flowchart 800 of alert correlation and handling. The flowchart 800 starts at module 802 with collecting related alerts in an incoming queue after a node does down.

The flowchart 800 continues to receive incoming alerts at module 804. Examples of such alerts are provided as part of module 804, including connect health is partial (806), tunnel is down (808), and node transmission/reception is 0 (810). Incoming alerts can continue to be queued as the flowchart 800 progresses.

The flowchart 800 continues to decision point 812 where it is determined whether traffic is interrupted. If it is determined traffic is interrupted (812-Yes), then the flowchart 800 continues to module 814 with notifying customer and to module 816 with rebooting node. If, on the other hand, it is determined traffic is not interrupted (812-No), then the flowchart 800 continues to module 816 as just described (skipping module 814).

The flowchart 800 continues to module 818 with calling provider API to trigger node restart and to module 820 with verification of node restart. In an example of operation, a node restart notification will eventually be received from the provider, which can take an amount of time that depends upon implementation-specific, environmental-specific, configuration-specific, and other factors.

The flowchart 800 continues to decision point 822 where it is determined whether a region is down. If it is determined a region is down (822-Yes), then the flowchart 800 continues to module 824 with verifying provider availability on region, to module 826 with verifying zone statuses from provider and to decision point 828. If, on the other hand, it is determined a region is not down (822-No), then the flowchart continues to decision point 828 where it is determined whether a provider zone is down.

If it is determined a provider zone is down (828-Yes), the flowchart 800 continues to module 830 with verifying zone status from provider, to module 832 with verifying CXPs reachable on zone, to module 834 with verifying nodes responding on zone, and then the flowchart 800 continues in FIG. 8B. If, on the other hand, it is determined a provider zone is not down (828-No), then the flowchart 800 continues in FIG. 8B (skipping modules 830-834).

In FIG. 8B, the flowchart 800 starts at module 842 with verifying node status from provider and continues to module 844 with verifying node up from infra controller, to module 846 with verifying tenant tunnel status, to module 848 with verifying tenant connector health status is healthy, to module 850 with verifying traffic flow has resumed, and to module 852 with verifying traffic flow status.

The flowchart 800 then continues to module 854 with generating verification logs and report and ends at module 856 with acknowledging and closing the ticket.

What is claimed is:

1. A system comprising:
   a first regional cloud exchange platform, associated with a first regional cloud exchange, that includes:
      a first regional cloud services monitoring engine; and
      a first regional cloud exchange monitoring engine;
   a second regional cloud exchange platform, associated with a second regional cloud exchange, that includes:
      a second regional cloud services monitoring engine; and
      a second regional cloud exchange monitoring engine;
   an alert triaging engine, coupled to the first regional cloud exchange platform and the second regional cloud exchange platform;
   a root cause determination engine, coupled to the alert triaging engine;
   a new alert definition engine, coupled to the root cause determination engine; and
   a constraints mapping engine, coupled to the new alert definition engine;
   wherein, in operation,
      the alert triaging engine:
         collects first related alerts associated with the first regional cloud exchange platform, including a first alert and a second alert, in an incoming alert queue;
         determines the first alert is a known alert;
         identifies a hierarchy of alerts with which the first alert is associated;
         performs automated recovery in association with the first alert and the second alert;
         verifies recovery associated with the first alert and the second alert; and
         alerts a customer with a third alert associated with the first alert and the second alert;
      the root cause determination engine:
         analyzes the first alert and the second alert to identify an underlying cause of the first alert and the second alert;
      the new alert definition engine:
         defines a new alert type based on the identified underlying cause; and
      the constraints mapping engine:
         updates a constraints datastore with characteristics of the new alert type to update the hierarchy of alerts.

2. The system of claim 1, wherein the alert triaging engine orchestrates resolution techniques associated with the first alert and the second alert.

3. The system of claim 1, wherein the alert triaging engine follows a verification checklist associated with the first alert and the second alert.

4. The system of claim 1, wherein the alert triaging engine acknowledges and closes a ticket associated with the first alert and the second alert.

5. The system of claim 1, wherein the alert triaging engine prepares a report for review associated with the first alert and the second alert.

6. The system of claim 1, wherein the alert triaging engine alerts an operations team with a fourth alert associated with the first alert and the second alert.

7. The system of claim 1, wherein when traffic associated with a node of the first regional cloud exchange platform is interrupted, a customer is notified.

8. The system of claim 1, wherein a call to a provider API is made to trigger a node restart.

9. The system of claim 1, wherein if a region is down, provider availability on the region is verified and zone statuses from the provider are verified.

10. The system of claim 1, wherein if a provider zone of the first regional cloud exchange platform is down, zone status from a provider is verified, cloud exchange platforms (CXPs) are reachable is verified, and nodes responsive on the provider zone are verified.

11. The system of claim 1, wherein if a node of the first regional cloud exchange platform is down, node status from a provider is verified, infra controller node up is verified, tenant tunnel status is verified, tenant connector health status is verified to be healthy, and traffic flow status is verified.

12. The system of claim 1, wherein, in operation, the alert triaging engine collects second related alerts associated with the second regional cloud exchange platform.

13. A method comprising:
   collecting, by an alert triaging engine, first related alerts associated with a first regional cloud exchange platform, including a first alert and a second alert, in an incoming alert queue;
   determining, by said alert triaging engine, the first alert is a known alert;
   identifying, by said alert triaging engine, a hierarchy of alerts with which the first alert is associated;
   performing, by said alert triaging engine, automated recovery in association with the first alert and the second alert;
   verifying, by said alert triaging engine, recovery associated with the first alert and the second alert;
   alerting, by said alert triaging engine, a customer with a third alert associated with the first alert and the second alert;
   analyzing, by a root cause determination engine, the first alert and the second alert to identify an underlying cause of the first alert and the second alert;
   defining, by said root cause determination engine, a new alert type based on the identified underlying cause;
   updating, by the root cause determination engine, a constraints datastore with characteristics of the new alert type to update the hierarchy of alerts; wherein the alert triaging engine is coupled to a first regional cloud services exchange platform and a second regional cloud exchange platform, wherein each of the first and second regional cloud service exchange platforms includes a regional cloud services monitoring engine and a regional cloud exchange engine;

wherein the root cause determination engine is coupled to the alert triaging engine, and a new alert definition engine is coupled to the root cause determination engine; and wherein a constraints mapping engine is coupled to the new alert definition engine.

14. The method of claim 13, comprising:

orchestrating resolution techniques associated with the first alert and the second alert;

following a verification checklist associated with the first alert and the second alert;

acknowledging and closing a ticket associated with the first alert and the second alert;

preparing a report for review associated with the first alert and the second alert;

alerting an operations team with a fourth alert associated with the first alert and the second alert.

15. The method of claim 13, wherein when traffic associated with a node of the first regional cloud exchange platform is interrupted, comprising:

notifying a customer;

making a call to a provider API to trigger a node restart.

16. The method of claim 13, wherein if a region is down, comprising verifying provider availability on the region and zone statuses from the provider.

17. The method of claim 13, wherein if a provider zone of the first regional cloud exchange platform is down, comprising verifying zone status from a provider, cloud exchange platforms (CXPs) are reachable, and nodes responsive on the provider zone.

18. The method of claim 13, wherein if a node of the first regional cloud exchange platform is down, verifying node status from a provider, infra controller node up, tenant tunnel status, tenant connector health status is healthy, and traffic flow status.

19. The method of claim 13, comprising collecting second related alerts associated with a second regional cloud exchange platform.

* * * * *